(12) United States Patent
Grottini

(10) Patent No.: US 8,888,996 B2
(45) Date of Patent: Nov. 18, 2014

(54) SANITIZING FILTER FOR WATER DISPENSER

(75) Inventor: Gianni Grottini, Porto Recanati (IT)

(73) Assignee: Blupura SRL, Castelfidaro (IT)

( * ) Notice: Subject to any disclaimer, the term of this patent is extended or adjusted under 35 U.S.C. 154(b) by 415 days.

(21) Appl. No.: 13/328,998

(22) Filed: Dec. 16, 2011

(65) Prior Publication Data

US 2012/0125825 A1 May 24, 2012

Related U.S. Application Data

(63) Continuation-in-part of application No. PCT/IB2010/001680, filed on Jun. 30, 2010.

(30) Foreign Application Priority Data

Jul. 3, 2009 (IT) .......................... AN2009A000037

(51) Int. Cl.
*B01D 35/143* (2006.01)
*B01D 35/157* (2006.01)
*C02F 9/00* (2006.01)
*C02F 1/00* (2006.01)
*C02F 1/50* (2006.01)

(52) U.S. Cl.
CPC ................ *C02F 9/005* (2013.01); *C02F 1/001* (2013.01); *C02F 2209/40* (2013.01); *C02F 1/50* (2013.01); *C02F 2209/005* (2013.01); *B67D 2210/0001* (2013.01); *C02F 2201/006* (2013.01)
USPC ................... 210/85; 210/86; 210/87; 210/91; 210/97; 210/198.1; 210/418; 210/443

(58) Field of Classification Search
CPC .... B01D 35/14; B01D 35/143; B01D 35/157; B01D 35/1573; B01D 2201/088; B01D 2201/16; B01D 2201/52; B01D 2201/0442; C02F 1/00; C02F 1/50; C02F 2201/005; C02F 2201/0061; C02F 1/001; C02F 9/005; C02F 2201/006; B67D 7/76; B67D 7/766
USPC ........ 210/85–87, 91, 94, 96.1, 418, 440, 443, 210/97, 198.1, 199; 222/189.06, 189.08
See application file for complete search history.

(56) References Cited

U.S. PATENT DOCUMENTS

| | | | | |
|---|---|---|---|---|
| 2,147,845 A | * | 2/1939 | Kistner | 251/276 |
| 3,756,413 A | * | 9/1973 | Gartner | 210/205 |
| 4,066,551 A | * | 1/1978 | Stern | 210/282 |
| 5,407,573 A | * | 4/1995 | Hughes | 210/266 |
| 5,552,057 A | * | 9/1996 | Hughes et al. | 210/668 |

(Continued)

FOREIGN PATENT DOCUMENTS

| | | |
|---|---|---|
| JP | 2003340211 A | 12/2003 |
| WO | WO93/17928 | 9/1993 |

(Continued)

*Primary Examiner* — Joseph Drodge
(74) *Attorney, Agent, or Firm* — Shalom Wertsberger; Saltamar Innovations

(57) ABSTRACT

A filter (1) to purify the water distributed by a dispenser, fitted with a special sanitizing device incorporated therein. Inside of the said filter (1), below the water chamber (3), is a disinfectant chamber (4) that contains the solution designed to sanitize the said dispenser. A mechanism causes the sanitizing solution to flow into the water chamber (3) of the filter (1) and into the piping, for performing the subsequent sanitizing action.

10 Claims, 2 Drawing Sheets

(56) References Cited

U.S. PATENT DOCUMENTS

| | | |
|---|---|---|
| 8,282,891 B2 * | 10/2012 | Dee et al. .................. 422/236 |
| 8,318,011 B2 * | 11/2012 | O'Brien et al. ............ 210/200 |
| 2006/0060512 A1 * | 3/2006 | Astle et al. ................. 210/85 |
| 2008/0217256 A1 * | 9/2008 | Everton ..................... 210/741 |
| 2012/0132573 A1 * | 5/2012 | Lautzenheiser et al. ...... 210/85 |

FOREIGN PATENT DOCUMENTS

| | | |
|---|---|---|
| WO | WO03/080128 | 10/2003 |
| WO | WO2007/001488 | 1/2007 |
| WO | WO2007/132170 | 11/2007 |
| WO | WO2009/033048 | 3/2009 |

* cited by examiner

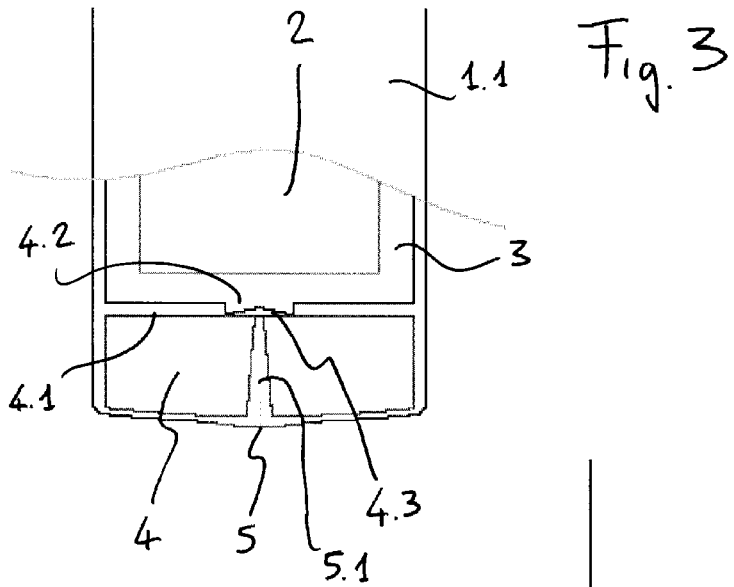
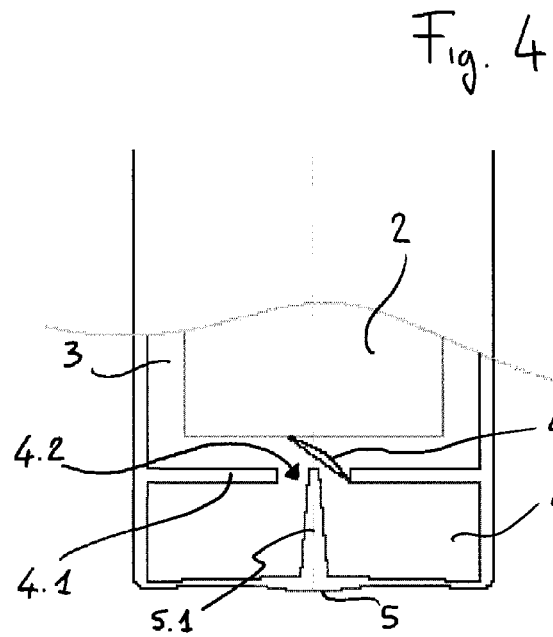
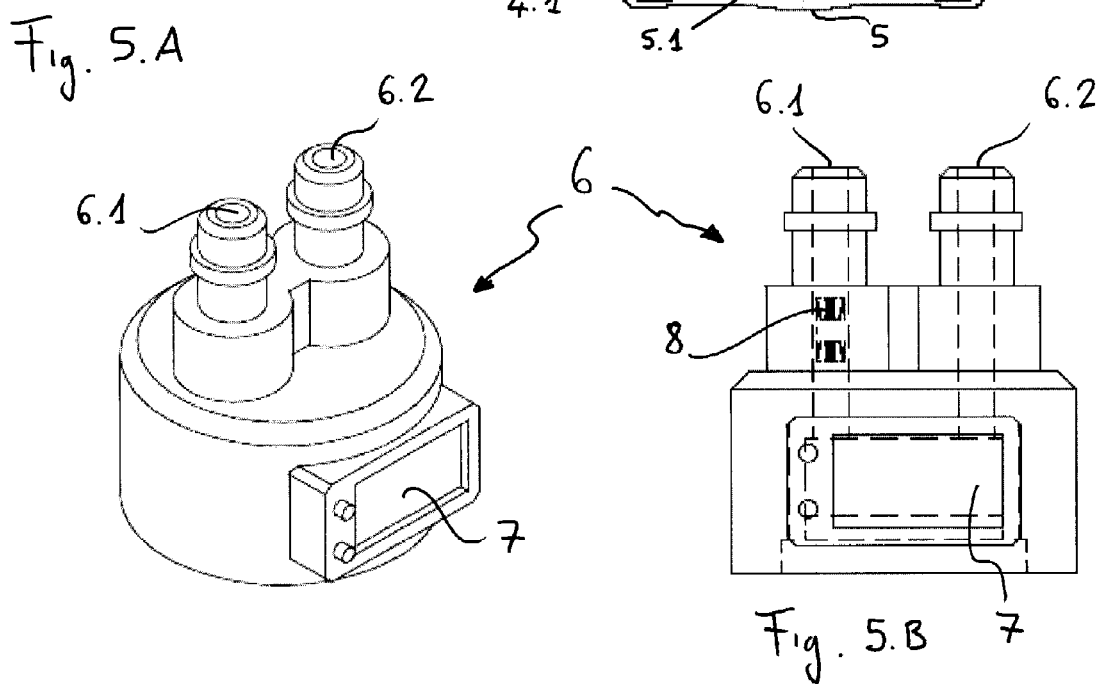

SANITIZING FILTER FOR WATER DISPENSER

FIELD OF THE INVENTION

The subject of this invention is a filter fitted with a special sanitizing system, that can disinfect a water dispenser or other beverage dispenser.

BACKGROUND

In recent years, the number of beverage dispensing machines in use has increased, found largely in cafeteria-style food service with large water consumption, such as in restaurants, hotels, bars, community centers, and canteens.

These sorts of water dispensers (henceforward the term will be used in its broadest sense of "beverage dispensing machine", not limited only to water) have construction and operating characteristics that have become standardized, which will not be described in the present specifications.

For these purposes, suffice it to say that all types of dispensers require a connection to the water lines and, in the more advanced versions, require a chiller to chill the beverage dispensed and allow the user to select the desired water temperature.

At the same time, any type of water dispenser must also include a specific filter designed to ensure the highest quality of the water, eliminating impurities, lime and other undesirable substances from the water.

The most commonly used types of filters are essentially:
- mechanical filters, with a washable mesh screen or similar features, which capture the deposited impurities;
- filters in a composite structure in active carbons, able to capture impurities of 0.5 micron and larger; sometimes such filters are combined with a UV bactericide;
- filters with ultra-filtering membrane, with holes of around one thousandth of a micron;
- reverse osmosis filters that also capture dissolved mineral salts, modifying the chemical and physical composition of the water.

Any type of filter must be submitted to ordinary maintenance which includes complete replacement after a certain time interval or after reaching a certain amount of dispensed water. Generally, it is recommended the replacement after 10,000/11,000 liters dispensed for standard filters (after 2,000/3,000 for smaller sizes); over this threshold, the exhausted filter ceases to work properly and could even release substances that could potentially contaminate the piping and the beverages dispensed to the user.

Therefore, it is essential not only to replace this filter, but also submit the water dispenser to a careful sanitization, which must be done periodically (generally every 6 or 12 months, depending on where the dispenser is installed and how frequently it is used) or before installing a new filter.

Sanitizing is done using acid solutions which can also remove lime deposits and bacteria biofilms that build up in time; the most commonly used solutions (although natural products can also be used) are comprised of one or more of the following chemical substances: hydrogen peroxide, active chlorine in a number of compounds, phosphoric acid, ozone, active oxygen, quaternary ammonium salts, and other substances. All these sanitizing products must be effective but must also be easily rinsed away to prevent disinfectant residue from being left on the dispenser when it is dispensing drinking water again.

In certain cases, users can handle the sanitizing process on their own by purchasing a special kit that includes a sanitizing product cartridge which is installed temporarily in place of the filter. However, in view of the importance of the procedure, sanitizing frequently requires a specialized technical service, which usually carries out the cleaning and sterilization of all the components in contact with the water by using a pump that injects the sanitizing solution into the water (similar to the method used to remove lime deposits from hot water heaters) or other methods. Finally, the sanitizing procedure requires care and additional expenses, whether maintenance is performed directly by the user or in a technical service call.

The purpose of this invention is to circumvent at least a part of the difficulties described above by developing a filter with a sanitizing device built in. This and other purposes, which will become clear below, are achieved in a sanitizing device incorporated into the usual water dispenser filter.

Additional features of the present invention will be better identified in the following description of a preferred embodiment, provided by way of a non-limiting example, in which:

BRIEF DESCRIPTION OF THE DRAWINGS

FIG. 3 represents a cutaway view of the sanitizing unit incorporated into the filter, in the inactive position;

FIG. 4 shows a cutaway view of the sanitizing unit incorporated into the filter, in the active position;

FIGS. 5.A and 5.B show, in front view and in cutaway view, the filter clamping cap with integrated sanitizer according to an embodiment of invention.

DETAILED DESCRIPTION

Figure 1:
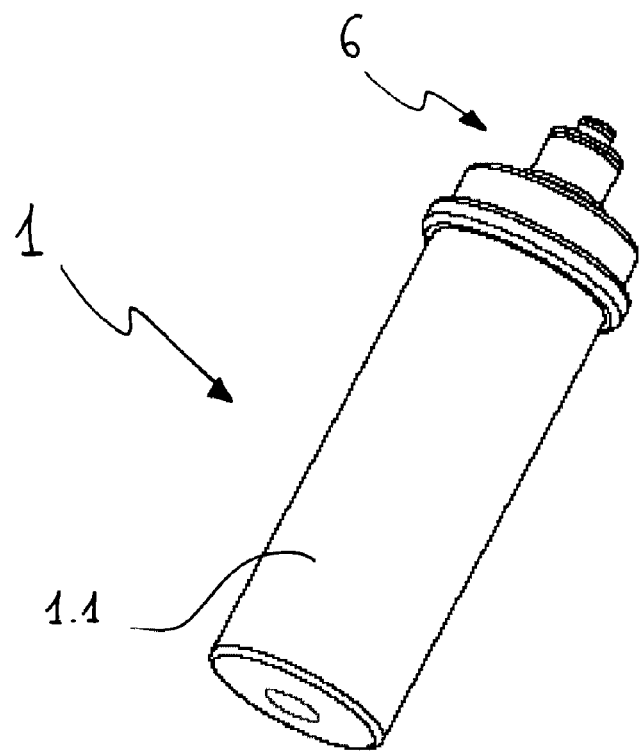
FIG. 1 represents a front view of the filter with incorporated sanitizer according to an embodiment of the invention.
Figure 2:
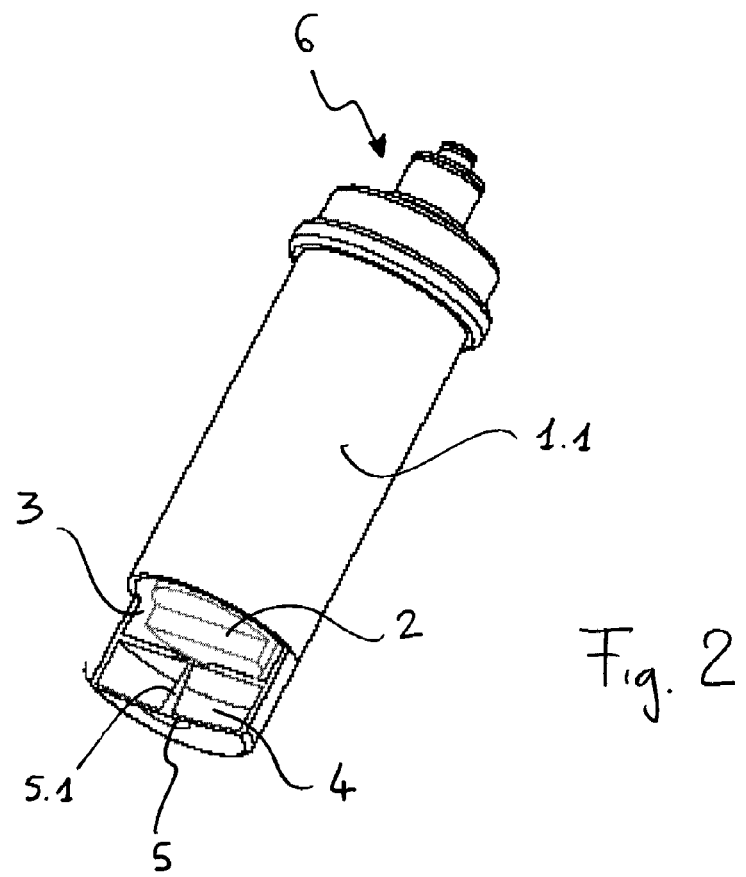
FIG. 2, in the same view as FIG. 1, represents a cutaway of the sanitizing unit incorporated into the filter according to an embodiment of the invention.

Below are the features of the a preferred embodiment of invention, using the references provided in the drawings.

With reference to FIG. 1, the number 1 indicates a filter designed to purify water issued from the dispenser, onto which a bayonet adaptor is inserted by means of an attachment head 6.

Inside the outer casing 1.1 of the said filter 1 is a customary filtration unit 2, through which the water flows as it enters into the filter through inlet 6.1 of the attachment head 6. As in prior art, after passing through the filtering unit 2, the purified water flows into chamber 3, surrounding this filtering unit 2; from here, it flows toward the user, flowing out from filter 1 through outlet 6.2 of the attachment head 6.

The description to this point corresponds substantially to a common filter of prior art.

The object of the present invention consists of the presence of an additional chamber 4, located below filter 1, separated from the chamber 3 above by a partition wall 4.1 but located inside the outer casing 1.1.

This chamber 4, which will henceforth be called "disinfectant chamber", contains the chemical or natural substance that will sanitize the water dispenser.

When considered appropriate, the contents of the disinfectant chamber 4 are made to flow into chamber 3 with a special mechanism that causes the opening of a passage 4.2 on the partition wall 4.1. Subsequently, the sanitizing solution is diluted in the water present in chamber 3, issuing into the dispenser piping down the line from filter 1 and disinfecting the dispenser.

The attached drawings show, without limitation, one possible version of the opening mechanism of the said passage 4.2 on the partition wall 4.1. This mechanism includes a pressure point 5 located outside on the casing wall below the disinfectant chamber 4. While acting on pressure point 5 (directly, or by way of example using a button or a lever), the lower wall of the disinfectant chamber 4 is pushed up, causing movement of a prick punch 5.1, located inside the disinfectant chamber 4, which acts together with the said lower wall. This prick punch 5.1 causes the breakage of a membrane 4.3 at a pre-set rupture pressure, allowing the disinfecting solution to enter into chamber 3 through passage 4.2.

In the preferred embodiment of the invention, the mechanism described above, which starts the water dispenser sanitization process, is activated after filter 1 is exhausted and before replacing it with a new filter. However, a variation of the invention is further considered, that makes it possible to sanitize the water dispenser before the filter 1 is exhausted. In this variation, the mechanism that allows the sanitizing solution to enter chamber 3 from the disinfectant chamber 4 does not cause a breakage of the said membrane 4.3, but rather only opens it temporarily. The objective can be achieved by providing that membrane 4.3 be a membrane that can open and close, but is normally closed, instead of a membrane that ruptures at a pre-set pressure.

With this variation, after the sanitizing procedure is complete, filter 1 can resume its purification work while the disinfectant chamber 4, now emptied of its sanitizing solution, is again separated from the chamber 3 above, by reclosing the membrane 4.3 and, as a result, of the passage 4.2.

In lieu of the membrane that opens and closes, a more elaborate solution, not demonstrated in the appended drawings, can include an actuator that uses elastic bands, which act like springs, to keep the passage 4.2 between the disinfectant chamber 4 and chamber 3 closed.

Another possibility is allowed by other variations with a momentary and reversible opening of the passage 4.2 can include the refilling of the disinfectant chamber 4 with sanitizing solution, so as to allow a second sanitizing procedure during the life of filter 1 or until its exhaustion, before disconnecting filter 1 from the dispenser and replacing it with a new filter.

The disinfectant chamber 4 can be refilled through an external opening, or the design can include that the entire disinfectant chamber can be removed from filter 1 and can be reconnected after replenishing the disinfecting solution.

As may be seen from the specifications, the main advantage of filter 1 fitted with the incorporated sanitizer lies in the simple and economic sanitizing process, performed directly by the user without the need for external technical services or temporary replacement of the filter with other kits purchased separately.

It is clear that numerous variations of filter 1 with the incorporated sanitizer are possible for a person of ordinary skill in the art without leaving the areas of novelty inherent in the inventive idea. It is also clear that in the practical use of the invention, the various components previously described may be replaced by technically equivalent elements.

For example, the invention may be designed for use of a sanitizing solution that can lend a certain color, odor or taste to the water directed to the user, to allow easy determination of when the sanitizing procedure is complete, and the water dispenser may be operated normally.

In one variation of the invention, shown in FIGS. 5.A and 5.B, filter 1 with the incorporated sanitizer can be fitted with electronic instruments. For example, as in prior art, the attachment head 6 can incorporate a meter to measure the water running through filter 1, information visible to the user on display 7, which may be analogue or digital. With the same electronic instruments, the user can receive the warning (which may be an audio warning) of the need for filter replacement or incorrect filter installation.

This information can be processed using an RFID tag 8 for radio frequency identification of filter 1, inserted into the attachment head 6 and which exchanges information with the corresponding transponder located on the water dispenser.

The invention claimed is:

1. A water filter for fluid dispensing system comprising:
   an outer casing having a water chamber and a disinfectant chamber;
   a water inlet and a water outlet;
   a filtering body disposed within the water chamber, and interposed within the fluid flow path between the inlet to the outlet;
   wherein the disinfectant chamber is being coupled to the water chamber via a controllable passage changeable from a closed state to an open state, and wherein placing the passage in an open state allows fluid communications between the water chamber and the disinfectant chamber;
   an actuator for controlling the state of the passage;
   wherein the passage between the water chamber and the disinfectant chamber comprises a membrane, and wherein actuating the actuator causes rupturing of the membrane or a portion thereof, thus changing the state of the passage to the open slate.

2. A water filter as claimed in claim 1, wherein the actuator comprises a pressure point located outside the casing, and wherein actuating the pressure point causes opening of the passage.

3. A water filter as claimed in claim 1, wherein the actuator comprises a punch disposed to rupture the membrane when the actuator is actuated.

4. A water filter as claimed in claim 3, wherein the punch is a prick punch.

5. A water filter as claimed in claim 1, wherein the disinfectant chamber is removable.

6. A water filter as claimed in claim 1, wherein the disinfectant provides an indication of its presence in the water by changing at least one attribute of the water.

7. A water filter as claimed in claim 6, wherein the indication is selected from color, odor, or taste.

8. A water filter as claimed in claim 1 further comprising electronic instruments configured to provide a user with information on the functioning of the filter, said information being water metering, an empty vessel warning, an error message for erroneous installation of the filter, or any combination thereof.

9. A filter as claimed in claim 8 further comprising an RFID tag for transmitting the information to an interrogating device.

10. A filter as claimed in claim 8 further comprising a display for displaying the information.

* * * * *